United States Patent Office 3,796,740
Patented Mar. 12, 1974

3,796,740
DIHYDRO-PGF$_{1\beta}$
Sune Bergstrom and Jan Sjovall, both of Kemiska Institutionen, Karolinska Institutet, Stockholm 60, Sweden
No Drawing. Application Feb. 12, 1971, Ser. No. 115,108, now abandoned, which is a continuation-in-part of application Ser. No. 203,752, June 20, 1962, now Patent No. 3,598,858, which is a continuation-in-part of application Ser. No. 199,209, Apr. 9, 1962, now abandoned, which in turn is a continuation-in-part of application Ser. No. 738,514, May 28, 1958, now Patent No. 3,069,322. Divided and this application July 3, 1972, Ser. No. 268,456
Int. Cl. C07c 61/32, 69/74
U.S. Cl. 260—468 D           7 Claims

ABSTRACT OF THE DISCLOSURE

The prostaglandin dihydro-PGF$_{1\beta}$, and its salts, esters, and alkanoates are disclosed. These novel compounds are useful for a variety of pharmacological purposes, including use as smooth muscle stimulants and as cardiovascular agents.

CROSS REFERENCE TO RELATED APPLICATIONS

This application is a division of our copending application Ser. No. 115,108, filed Feb. 12, 1971, now abandoned, which is a continuation-in-part of our copending application Ser. No. 203,752, filed June 20, 1962, now Pat. No. 3,598,858, which is a continuation-in-part of our copending application Ser. No. 199,209, filed Apr. 9, 1962, now abandoned, which is a continuation-in-part of our copending application Ser. No. 738,514, filed May 28, 1958, now Pat. No. 3,069,322.

DESCRIPTION OF THE INVENTION

This invention relates to novel compositions of matter, and is more specifically concerned with novel organic compounds of the formula:

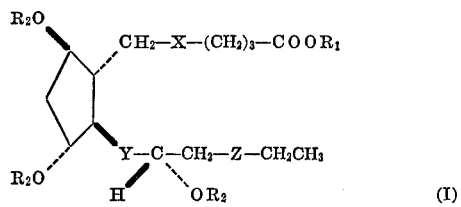

wherein Y is —CH$_2$CH$_2$— or trans—CH=CH—, and both X and Z are —CH$_2$CH$_2$—, or wherein Y is trans—CH=CH—

X is cis—CH=CH, and Z is —CH$_2$CH$_2$— or cis—CH=CH— wherein R$_1$ is hydrogen or hydrocarbyl of not more than 13 carbon atoms, and wherein R$_2$ is hydrogen or lower alkanoyl, and pharmacologically acceptable salts thereof when R$_1$ is hydrogen. Included in Formula I are acids, salts, esters, and alkanoates of the formulas:

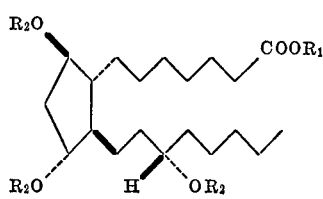

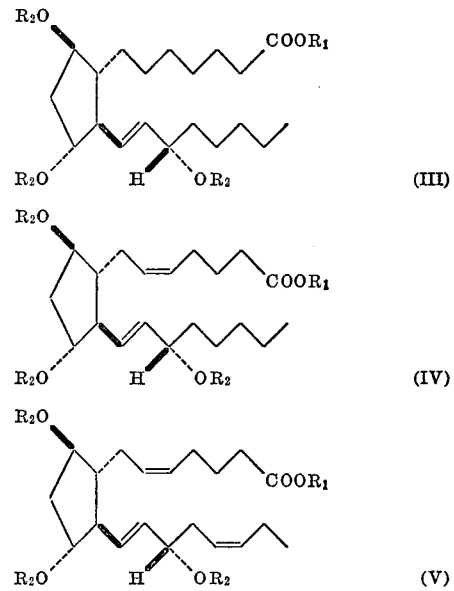

wherein R$_1$ and R$_2$ are as defined above. Molecules of the compounds encompassed by Formulas I, II, III, IV, and V each have several centers of asymmetry. Formulas I, II, III, IV, and V are intended to represent optically active compounds each with the same absolute configuration as optically active prostaglandin E (PGE), later named prostaglandin E$_1$ (PGE$_1$), and obtained from certain mammalian tissues, for example, sheep vesicular glands. See our said Pat. No. 3,069,322. See also later publications, for example, Bergstrom et al., J. Biol. Chem. 238, 3555 (1963), Bergstrom et al., Pharmacol. Rev. 20, 1 (1968), and references cited in those.

In Formulas I, II, III, IV, and V, a broken line attachment to the cyclopentane ring indicates a chain or group in alpha configuration, i.e., below the plane of the cyclopentane ring. A heavy solid line attachment to the cyclopentane ring indicates a chain in beta configuration, i.e., above the plane of the cyclopentane ring. The configuration of the side chain hydroxy in Formulas I, II, III, IV, and V is S.

A systematic name for the compound of Formula II wherein R$_1$ and R$_2$ are hydrogen is 3α,5β-dihydroxy-2β-[(3S)-3-hydroxyoctyl]-1α - cyclopentaneheptanoic acid. For convenience, this compound is designated dihydro-PGF$_{1\beta}$.

A systematic name for the compound of Formula III wherein R$_1$ and R$_2$ are hydrogen is 7-[3α,5β-dihydroxy-2β-[(3S)-3-hydroxy-trans - 1 - octenyl]-1α-cyclopentyl]-heptanoic acid. For convenience, this compound is designated PGF$_{1\beta}$.

A systematic name for the compound of Formula IV wherein R$_1$ and R$_2$ are hydrogen is 7-[3α,5β-dihydroxy-2β-[(3S)-3-hydroxy-trans - 1 - octenyl]-1α-cyclopentyl]-cis-5-heptenoic acid. For convenience, this compound is designated PGF$_{2\beta}$.

A systematic name for the compound of Formula V wherein R$_1$ and R$_2$ are hydrogen is 7-[3α,5β-dihydroxy-2β-[(3S)-3-hydroxy-trans-1,cis - 5 - octadienyl]-1α-cyclopentyl]-cis-5-heptenoic acid. For convenience, this compound is designated PGF$_{3\beta}$.

Dihydro-PGF$_{1\beta}$, PGF$_{1\beta}$, PGF$_{2\beta}$, and PGF$_{3\beta}$ were previously named dihydro-epi-PGF, epi-PGF, bisdehydro-epi-PGF, and tetradehydro-epi-PGF, respectively. See our said copending application Ser. No. 203,752.

With regard to Formulas I, II, III, IV, and V, examples of hydrocarbyl of not more than 13 carbon atoms are alkyl, e.g., methyl, propyl, hexyl, decyl; cycloalkyl, e.g., cyclopropyl, 2-butylcyclopropyl, cyclobutyl, cyclobutylmethyl, 3-pentylcyclobutyl, 2,2-dimethylcyclobutyl, cyclopentyl, 3-tert-butylcyclopentyl, 2-cyclopentylethyl, cyclohexyl, cyclohexylmethyl; aralkyl, e.g., benzyl, phenethyl, 1-phenylethyl, 2-phenylpropyl, 3-phenylbutyl, 2-(1-naphthyethyl), benzhydryl; aryl, e.g., phenyl, p-tolyl, p-ethylphenyl, p-tert-butylphenyl, 1-naphthyl; and such unsaturated moieties as allyl, crotyl, and proparyl.

With further regard to Formulas I, II, III, IX, and V, examples of lower alkanoyl are alkanoyl of 2 to 8 carbon atoms, inclusive, e.g., acetyl, propionyl, butyryl, valeryl, hexanoyl, heptanoyl, octanoyl, and branched chain isomeric forms of those, e.g., isobutyryl and isovaleryl.

The novel compounds of Formulas I, II, III, IV, and V, i.e., dihydro-$PGF_{1\beta}$, $PGF_{1\beta}$, $PGF_{2\beta}$, $PGF_{3\beta}$ and their salts, esters, and alkanoates are extremely potent in causing stimulation of smooth muscle as shown, for example, by tests on strips of guinea pig ileum, rabbit duodenum, or gerbil colon. These compounds are also highly active in potentiating other known smooth muscle stimulators, for example, oxytocic agents, e.g., oxytocin and the various ergot alkaloids including derivatives and analogs thereof. Accordingly, these novel Formulas I, II, III, IV, and V compounds are useful in place of or in combination with less than the usual amounts of these and other known smooth muscle stimulators whenever smooth muscle stimulation is needed to alleviate or prevent some physiological condition in mammals, including humans, useful domestic animals, pets, zoological specimens, and laboratory animals, for example, mice, rabbits, rats, and monkeys. For example, these compounds can be used to alleviate or prevent conditions of gastrointestinal atony in mammals, including humans, e.g., paralytic ileus following anesthesia and surgical operation or from other medical causes. For this purpose, the compound is administered parenterally, e.g., subcutaneously, intramuscularly or by intravenous injection or infusion in a dose range 0.1 to 2 mg. per kg. of body weight per day, the exact dose depending on the age, weight, and condition of the patient or animal, and the frequency and route of administration. Small repeated doses are indicated when the aim is to prevent rather than alleviate the atony.

Another smooth muscle stimulatory area where these novel Formula I, II, III, IV, and V compounds are useful is in the control or prevention of atonic uterine bleeding in mammals after absortion or delivery, to aid in the expulsion of the placenta, and during the puerperium. For this purpose, the compound is administered by intravenous infusion immediately after absortion or delivery at a dose in the range about 0.1 to about 100 μg. per kg. of body weight per minute until the desired effect is obtained. Subsequent doses are given by intravenous, subcutaneous, or intramuscular injection or infusion during puerperium in the range 0.1 to 2 mg. per kg. of body weight per day, again the exact dose depending on the age, weight, and condition of the patient or animal.

In still another smooth muscle stimulatory area, these novel compounds of Formulas I, II, III, IV, and V are surprisingly useful in place of oxytocin to induce labor in pregnant female animals, including man, cows, sheep, and pigs, at or near term, or in pregnant animals with intrauterine death of the fetus from about 20 weeks to term. For this purpose, the compound is infused intravaneously at a dose of 0.1 to 100 μg. per kg. of body weight per minute until at or near the termination of the second stage of labor, i.e., expulsion of the fetus. These compounds are especially useful when the female is one or more weeks postmature and natural labor has not started, or 12 to 60 hours after the membranes have ruptured and natural labor has not yet started. An alternative route of administration is oral.

The novel compounds of Formulas I, II, III, IV, and V are also useful for controlling the reproductive cycle in ovulating female mammals, including humans and animals such as monkeys, rats, rabbits, dogs, cattle, and the like. By the term ovulating female mammals is meant animals which are mature enough to ovulate but not so old that regular ovulation has ceased. For that purpose, $PGF_{2\beta}$, for example, is administered systemically at a dose level in the range 0.1 mg. to about 20 mg. per kg. of body weight of the female mammal, advantageously during a span of time starting approximately at the time of ovulation and ending approximately at the time of menses or just prior to menses. Intravaginal and intrauterine are alternative routes of administration. Additionally, expulsion of an embryo or a fetus is accomplished by similar administration of the compound during the first third of the normal mammalian gestation period.

The novel compounds of Formulas I, II, III, IV and V are also useful in mammals, including man, as nasal decongestants. For this purpose, the compounds are used in a dose range of about 10 μg. to about 10 mg. per ml. of a pharmacologically suitable liquid vehicle or as an aerosol spray, both for topical application. The novel Formula I, II, III, IV, and V compounds also lower systemic arterial blood pressure in anesthetized (pentobarbital sodium) pentolinium-treated rats with indwelling aortic and right heart cannulas. Accordingly, these novel compounds are useful as hypotensive agents to reduce blood pressure in mammals, including man. For this purpose, the compounds are administered by intravenous infusion at the rate about 0.1 to about 100 μg. per kg. of body weight per minute, or in single or multiple doses of about 100 μg. to 5 mg. per kg. of body weight total per day.

The novel Formula I, II, III, IV, and V compounds of this invention are used for the purposes described above in the free acid form, in ester form, in alkanoate form, in ester-alkanoate form, or in pharmacologically acceptable salt form. When the ester or ester-alkanoate form is used, the ester moiety is any of those within the definition of $R_1$. However, it is preferred that the $R_1$ moiety not contain olefinic or acetylenic unsaturation. More preferred are alkyl esters wherein the alkyl moiety contains one to 8 carbon atoms, inclusive. Especially preferred are alkyl of one to 4 carbon atoms, inclusive. Of those alkyl, methyl and ethyl are especially preferred for optimum absorption of the compound by the body or experimental animal system.

Examples of alkyl of one to 4 carbon atoms are methyl, ethyl, propyl, isopropyl, butyl, isobutyl, sec-butyl and tert-butyl. Examples of alkyl of one to 8 carbon atoms are those mentioned above, and also pentyl, hexyl, heptyl, octyl, and branched chain isomers thereof, e.g. 2-ethylhexyl.

When the alkanoate or ester-alkanoate form is used, the alkanoyl moiety is any of those within the definition of $R_2$. However, acetyl is especially preferred for optimum absorption of the compound by the body or experimental animal system. In Formulas I, II, III, IV, and V, it is intended that all $R_2$ be hydrogen or that all be alkanoyl.

Pharmacologically acceptable salts of the Formula I, II, III, IV, and V compounds wherein $R_1$ is hydrogen useful for the purposes described above are those with pharmacologically acceptable metal cations, ammonium, amine cations, or quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and araliphatic amines containing up to and including about 18 carbon atoms, as well as heterocyclic amines, e.g. piperidine, morpholine, pyrrolidine, piperazine, and lower-alkyl derivatives thereof, e.g., 1 - methylpiperidine, 4 - ethylmorpholine, 1 - isopropylpyrrolidine, 2 - methylpyrrolidine, 1,4-dimethylpiperazine, 2 - methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2 - amino - 2 - ethyl - 1,3 - propanediol, 2-amino-2-methyl - 1 - propanol, tris(hydroxymethyl)aminomethane, N - phenylethanolamine, N - (p - tert - amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethylammonium, and the like.

When the novel Formula I, II, III, IV, and V compounds are used for intravenous injection or infusion, sterile aqueous isotonic solutions are preferred. For that purpose, it is preferred because of increased water solubility that $R_1$ in Formula I, II, III, IV, and V be hydrogen or a pharmacologically acceptable cation. For subcutaneous or intramuscular injection, sterile solutions or suspensions of the acid, salt, or ester in aqueous or non-aqueous media are used. Tablets, capsules, and liquid preparations such as syrups, elixers, and simple solutions, with the usual pharmaceutical carriers, are used for oral or sublingual administration. For rectal, vaginal, or intrauterine administration, suppositories, lavage and douche preparations, and solutions as such or contained in a sponge, all prepared by methods known in the art, are used.

Dihydro-$PGF_{1\beta}$ (Formula II, $R_1$ and $R_2$=H) is prepared by catalytic hydrogenation of $PGF_{1\beta}$, $PGF_{2\beta}$, or $PGF_{3\beta}$ (Formulas III, IV, and V, respectively, $R_1$ and $R_2$=H). Similarly, the esters and alkanoates of dihydro-$PGF_{1\beta}$ are prepared by catalytic hydrogenation of the corresponding esters and alkanoates of $PGF_{1\beta}$, $PGF_{2\beta}$, and $PGF_{3\beta}$.

These catalytic hydrogenations are carried out by methods known in the art for saturating olefinic compounds. Suitable hydrogenation catalysts are those containing platinum or palladium alone or on an inert carrier. Especially preferred catalysts are the finely-divided platinum metal obtained by prior or simultaneous hydrogenation of the platinum oxide known as Adams' catalyst (Org. Syn. Coll., vol. 1, 463 (1941)), or finely divided palladium metal supported on a carbon carrier, advantageously containing about 5 percent palladium by weight. Another useful catalyst for this purpose is rhodium metal (5%) on alumina. Suitable liquid hydrogenation diluents are ethanol, ethanol containing a small percentage of acetic acid, i.e., about one to about 15 percent by volume of acetic acid, dioxane, and ethyl acetate. Hydrogenation pressures ranging from about atmospheric to about 50 p.s.i., and hydrogenation temperatures ranging from about 10° to about 100° C. are preferred. When $PGF_{1\beta}$ or one of its esters or alkanoates is used, the hydrogenation process is stopped after absorption of one equivalent of hydrogen, and the resulting dihydro product is isolated from the reaction mixture by conventional methods, for example, removal of the catalyst by filtration or centrifugation, followed by evaporation of the liquid diluent. When $PGF_{2\beta}$ or $PGF_{3\beta}$ or their esters or alkanoates are used for this catalytic hydrogenation, additional hydrogen will be necessary for complete saturation of all of the carbon-carbon double bonds, two equivalents in the case of the $PGF_{2\beta}$ reactants and three equivalents in the case of the $PGF_{3\beta}$ reactants.

These hydrogenations will also saturate any olefinic or acetylenic unsaturation present in the hydrocarbyl portion of the $PGF_{1\beta}$, $PGF_{2\beta}$, or $PGF_{3\beta}$ reactant. Enough additional hydrogen should be used to saturate those other double and triple bonds to insure complete saturation of the double bonds in the prostaglandin side chains. If a Formula II dihydro-$PGF_{1\beta}$ ester with an olefinic or acetylenic $R_1$ moiety is desired, that is made by esterification of the dihydro-$PGF_{1\beta}$ acid.

Other reactants for producing dihydro-$PGF_{1\beta}$ and its esters are the compounds known as dihydro-$PGE_1$ and its esters. Similarly, $PGF_{1\beta}$ and its esters are prepared from the compounds known as $PGE_1$ and its esters, $PGF_{2\beta}$ and its esters are prepared from the compounds known as $PGE_2$ and its esters, and $PGF_{3\beta}$ and its esters are prepared from the compounds known as $PGE_3$ and its esters. The structural formulas of these dihydro-$PGE_1$ (VI), $PGE_1$ (VII), $PGE_2$ (VIII), and $PGE_3$ (IX) reactants are as follows:

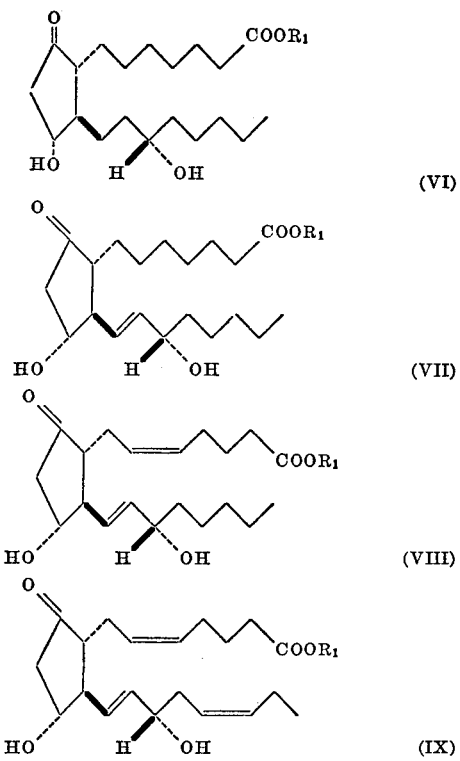

These dihydro-$PGE_1$, $PGE_1$, $PGE_2$, and $PGE_3$ acid and ester reactants are prepared as described in our said Pat. No. 3,069,322 and in our said copending application Ser. No. 203,752.

In these transformations of these PGE-type compounds to the desired and novel $PGF_\beta$-type acids and esters of this invention, the ring carbonyl of the PGE-type reactant is reduced to a secondary alcohol group with sodium borohydride in the presence of an inert diluent, advantageously, methanol. A mixture of two isomeric secondary alcohols is produced by each of these ring carbonyl reductions. For example, ring carbonyl reduction of $PGE_1$ gives a mixture of $PGF_{1\beta}$ (Formula III, R=H) and the isomeric compound known as $PGF_{1\alpha}$. The latter compound has the structural formula:

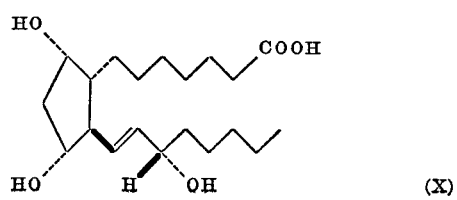

The preparation of $PGF_{1\alpha}$ by another method is described in our said Pat. No. 3,069,322. $PGF_{1\alpha}$ is separated from $PGF_{1\beta}$ by chromatography as described hereinafter. In a similar manner, ring carbonyl reduction of dihydro-$PGE_1$ gives a mixture of dihydro-$PGF_{1\beta}$ and dihydro-$PGF_{1\alpha}$, ring carbonyl reduction of $PGE_2$ gives a mixture of $PGF_{2\beta}$ and $PGF_{2\alpha}$, and ring carbonyl reduction of $PGE_3$ gives a mixture of $PGF_{3\beta}$ and $PGF_{3\alpha}$. Similarly, ring carbonyl reduction of the esters of dihydro-$PGE_1$, $PGE_1$, $PGE_2$, and $PGE_3$ gives corresponding mixtures of the $PGF_\beta$-type and $PGF_\alpha$-type esters. The components of each of these mixtures of $PGF_\beta$-type and $PGF_\alpha$-type acids or esters are separated by chromatography as described hereinafter.

For these ring carbonyl reductions, a cold solution or suspension of sodium borohydride in methanol is added to a cold solution of the PGE-type reactant in methanol. The mixture is maintained cold for about 10 to 60 minutes, and is then maintained at about 25° C. for about one to two hours. The resulting mixture of $PGF_\alpha$-type and $PGF_\beta$-type products is then isolated and separated into its components as described hereinafter. About three parts by weight of sodium borohydride is used for each part by weight of the PGE-type reactant. Suitable amounts of methanol are about 100 ml. for each gram of the PGE-type reactant and about 100 ml. for each gram of the sodium borohydride. A suitable cold temperature is about 0° C.

When dihydro-$PGF_{1\beta}$ (Formula II, R=H), $PGF_{1\beta}$ (Formula III, R=H), $PGF_{2\beta}$ (Formula IV, R=H) or $PGF_{3\beta}$ (Formula V) has been prepared by ring carbonyl reduction of the corresponding PGE-type reactant, or when dihydro-$PGF_\beta$ has been prepared by catalytic hydrogenation as described above, and a hydrocarbyl ester is desired for one of the above-described pharmacological purposes, those acids are esterified by procedures known in the art. Illustratively, the alkyl esters are prepared by reaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 389–394 (1954).

An alternative method for esterification of the carboxyl moiety of these $PGF_\beta$-type acids comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

When a trialkanoate of one of the Formula I, II, III, IV, or V $PGF_\beta$-type acids or esters (all $R_2$=lower alkanoyl) is desired for one of the above-described pharmacological purposes, it is prepared by reacting the corresponding trihydroxy compounds, i.e., all $R_2$=hydrogen) with an alkanoic anhydride corresponding to an alkanoic acid of 2 to 8 carbon atoms, inclusive. Examples of these anhydrides are acetic anhydride, propionic anhydride, butyric anhydride, valeric anhydride, hexanoic anhydride, heptanoic anhydride, octanoic anhydride, and isomeric forms of those.

This reaction leading to these trialkanoates is advantageously carried out by mixing the hydroxy compound and the acid anhydride, preferably in the presence of a tertiary amine such as pyridine or triethylamine. A substantial excess of the anhydride is used, preferably about 10 to 10,000 moles of anhydride per mole of the hydroxy compound reactant. The excess anhydride serves as a reaction diluent and solvent. An inert organic diluent, for example, dioxane, can also be added. It is preferred to use enough of the tertiary amine to neutralize the carboxylic acid produced by the reaction, as well as any free carboxyl groups present in the hydroxy compound reactant.

The reaction is preferably carried out in the range about 0° to about 100° C. The necessary reaction time will depend on such factors as the reaction temperature, and the nature of the anhydride and tertiary amine reactants. With acetic anhydride, pyridine, and a 25° C. reaction temperature, a 12 to 24-hour reaction time is used.

The desired trialkanoate is isolated from the reaction mixture by conventional methods. For example, the excess anhydride is decomposed with water, and the resulting mixture acidified and then extracted with a solvent such as diethyl ether. The desired trialkanoate is recovered from the diethyl ether extract by evaporation. The trialkanoate is then purified by conventional methods, advantageously by chromatography.

Each of the Formula I, II, III, IV, and V $PGF_\beta$-type acids ($R_1$ is hydrogen) is transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate corresponding to the inorganic salt desired. For example, such use of sodium hydroxide sodium carbonate, or sodium bicarbonate gives a solution of the sodium salt of the prostanoic acid derivative. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the corresponding quaternary ammonium hydroxide in water solution, followed by evaporation of the water.

The invention can be more fully understood by the following examples.

Example 1.—$PGF_{1\beta}$

A solution of 100 mg. of $PGE_1$ dissolved in 10 ml. of methanol is cooled in an ice bath. A chilled solution of 300 mg. of sodium borohydride in 35 ml. of methanol is added. After 20 minutes at 0° C., the mixture is left at room temperature for one hour. Water is added and most of the methanol is taken off in vacuo. After acidification with hydrochloric acid, the aqueous phase is extracted three times with ether, and the combined ether extract is washed with water and brought to dryness at room temperature. The residue is subjected to reversed phase partition chromatography on hydrophobic kieselguhr using 43 percent aqueous methanol as the mobile phase and equal parts of isooctanol and chloroform as the stationary phase. The dried ether extract is placed on the column with 16 ml. of the stationary phase and developed with 1200 ml. of mobile phase. The 475–650 ml. fractions are combined and taken to dryness and crystallized from ethyl acetate-pentane. The yield is 37 mg. of $PGF_{1\alpha}$; M.P. 101° C. The 300–425 ml. fractions are processed in a like manner and crystallized from ethyl acetate-pentane to yield 47 mg. of crystalline $PGF_{1\beta}$ having a melting point of 128° C. The paper chromatographic mobilities relative to $PGE_1$ on descending paper chromatography with ethylene chloride-heptane (1:1) as moving phase and 70% aqueous acetic acid as stationary phase are $PGE_1$ (1.00), $PGF_{1\alpha}$ (0.64), and $PGF_{1\beta}$ (0.44).

Example 2.—$PGF_{2\beta}$

Following the procedure of Example 1 but replacing $PGE_1$ with $PGE_2$, a mixture of $PGF_{2\alpha}$ and $PGF_{2\beta}$ is obtained. The $PGF_{2\alpha}$ and $PGF_{2\beta}$ are separated as described in Example 1. The paper chromatographic mobilities relative to $PGE_1$ determined as described in Example 1 are $PGE_1$ (1.00), $PGE_2$ (0.90), $PGF_{2\alpha}$ (0.60), and $PGF_{2\beta}$ (0.39). The $PGF_{2\alpha}$ and $PGF_{2\beta}$ obtained by this process are sufficiently pure to give substantially ideal curves on partition chromatography, using an ethylene chloride:heptane:acetic acid:water (15:15:6:4) solvent system, that is, curves typical of the essentially pure compounds.

Example 3.—$PGF_{3\beta}$

Following the procedure of Example 1 but replacing $PGE_1$ with $PGE_3$, a mixture of $PGF_{3\alpha}$ and $PGF_{3\beta}$ is obtained. The $PGF_{3\alpha}$ and $PGF_{3\beta}$ are separated as described in Example 1. The paper chromatographic mobilities relative to $PGE_1$ determined as described in Example 1 are $PGE_1$ (1.00); $PGE_3$ (0.76), $PGF_{3\alpha}$ (0.60), and $PGF_{3\beta}$ (0.37). The $PGF_{3\alpha}$ and $PGF_{3\beta}$ obtained by this process are sufficiently pure to give substantially ideal curves on partition chromatography, using an ethylene chloride:heptane:acetic acid:water (15:15:6:4) solvent system, that is, curves typical of the essentially pure compounds.

Example 4.—$PGF_{1\beta}$

A suspension of sodium borohydride (900 mg.) in 105 ml. of cold methanol is added in several portions during three minutes with stirring to an ice-cold solution of $PGE_1$ (300 mg.) in 30 ml. of methanol. After 20 minutes at 0° C., the mixture is allowed to warm to 25° C., and is maintained there for one hour. The mixture is then concentrated under reduced pressure, diluted with water, acidified, and extracted with diethyl ether. The extract is washed with water, dried, and evaporated. The residue is subjected to reversed phase chromatography over siliconized diatomaceous earth (Gas-Chrom CLZ 100–200 mesh with mobile and stationary phase composed of the upper and lower phase, respectively, derived from 516 ml. of methanol, 684 ml. of water, 60 ml. of isooctanol, and 60 ml. of chloroform). The eluate fractions are analyzed by thin layer chromatography with the A–IX system. The $PGF_{1\beta}$ is eluted first, followed by the $PGF_{1\alpha}$. Eluate fractions containing only $PGF_{1\alpha}$ are combined and evaporated. Eluate fractions containing only $PGF_{1\beta}$ are combined and evaporated. Those eluate fractions containing both compounds are combined and evaporated, and the resulting residue is chromatographed on acid-washed silica gel, eluting first with ethyl acetate, and then with ethyl acetate containing 2% methanol and 1% acetic acid. The eluate fractions are analyzed as above. The $PGF_{1\alpha}$ is eluted first. Additional $PGF_{1\alpha}$ and $PGF_{1\beta}$ are thereby obtained. After two crystallizations from a mixture of ethyl acetate and Skellysolve B (a mixture of isomeric hexanes), the $PGF_{1\alpha}$ has M.P. 101–103° C.; the $PGF_{1\beta}$ has M.P. 127–130° C.

Example 5.—$PGF_{2\beta}$

Following the procedure of Example 4, $PGE_2$ (4.00 g.) is reduced with sodium borohydride to a mixture of $PGF_{2\alpha}$ and $PGF_{2\beta}$. Crystallization from ethyl acetate gives 2.8 g. of a crystalline fraction rich in $PGF_{2\beta}$ and a filtrate containing 1.2 g. of a fraction rich in $PGF_{2\alpha}$. Each fraction is chromatographed separately on acid-washed silica gel. The $PGF_{2\alpha}$ part from each fraction is eluted with ethyl acetate containing 2% methanol and 1% acetic acid. The $PGF_{2\beta}$ part from each is then eluted with ethyl acetate containing 4% methanol and 2% acetic acid. Eluate fractions are analyzed by thin layer chromatography with the A–IX system. Eluate fractions containing only $PGF_{2\alpha}$ are combined and evaporated to give 1.77 g. of $PGF_{2\alpha}$. Eluate fractions containing only $PGF_{2\beta}$ are combined and evaporated to give 2.10 of $PGF_{2\beta}$. $PGF_{2\alpha}$ is a viscous colorless oil which is crystallized from diethyl ether; M.P. 30–35° C.; infrared absorption (neat) at 3320, 2640, 1710, 1295, 1260, 1245, 1120, 1080, 1055, 1025, and 975 cm.$^{-1}$. $PGF_{2\beta}$ is crystallized as colorless prisms from ethyl acetate; M.P. 96.5–97° C., infrared absorption (mineral oil mull) at 3440, 3260, 3220, 2720, 2660, 2600, 1697, 1275, 1250, 1200, 1040, 977 and 968 cm.$^{-1}$.

Example 6.—$PGF_{1\beta}$ methyl ester

To a dry ether solution of one milligram of $PGF_{1\beta}$ is added a slight excess of diazomethane prepared in ether from four micromoles of nitrosomethylurethane. The reaction mixture is allowed to stand about 5 minutes, and the ether and excess diazomethane are then distilled off. On distillation to dryness. $PGF_{1\beta}$ methyl ester is obtained; M.P. 107–108° C.

Example 7.—$PGF_{2\beta}$ methyl ester

Following the procedure of Example 6, $PGF_{2\beta}$ is transformed to its methyl ester.

Example 8.—$PGF_{3\beta}$ methyl ester

Following the procedure of Example 6, $PGF_{3\beta}$ is transformed to its methyl ester.

Example 9.—$PGF_{1\beta}$ methyl ester triacetate $PGF_{1\beta}$ methyl ester (10 mg.) is mixed with acetic anhydride (2 ml.) and pyridine (2 ml.). The resulting mixture is allowed to stand at 25° C. for 18 hours. The reaction mixture is then cooled externally with ice, diluted with water, and then acidified with dilute hydrochloric acid to pH 1. That mixture is extracted three times with diethyl ether. The combined extracts are washed successively with dilute hydrochloric acid, dilute aqueous sodium bicarbonate solution, and water, dried, and evaporated to give $PGF_{1\beta}$ methyl ester triacetate.

Example 10.—$PGF_{2\beta}$ methyl ester triacetate

Following the procedure of Example 9, $PGF_{2\beta}$ methyl ester is transformed to the triacetate.

Example 11.—$PGF_{3\beta}$ methyl ester triacetate

Following the procedure of Example 9, $PGF_{3\beta}$ methyl ester is transformed to the triacetate.

The methyl esters and methyl ester triacetates of Examples 6, 7, 8, 9, 10, and 11 have the following retention times:

| $PGF_\beta$-type | Methyl ester | Methyl ester triacetate |
|---|---|---|
| $PGF_{1\beta}$ | 1.00 | 1.00 |
| $PGF_{2\beta}$ | 0.89 | 0.85 |
| $PGF_{3\beta}$ | 0.86 | 0.86 |

Conditions: Flash heater at 220° C.; Column temperature 200° C.; Column pressure 1.0 kg./cm.$^2$; Column 6 ft. x 5 mm. packed with 0.5% QF-1 (Dow Corning Corp.) on Gas Chrom P (Applied Science Laboratory, Inc.), as described by VandenHeuvel et al., J. Am. Chem. Soc. 83, 1513 (1961).

Example 12.—Dihydro-$PGF_{1\beta}$ methyl ester

A solution of dihydro-$PGF_{1\beta}$ (6 mg.) in a mixture of methylene chloride and methanol is treated with excess diazomethane in diethyl ether and allowed to stand 15 minutes. The reaction mixture is evaporated to give dihydro-$PGF_{1\beta}$ methyl ester; M.P. 63–65° C.

Following the procedures of Examples 6 or 12 but replacing diazomethane with diazoethane, diazobutane, 1-diazo-2-ethylhexane, cyclohexyldiazomethane, and phenyldiazomethane, and using each in turn, dihydro-$PGF_{1\beta}$, $PGF_{1\beta}$, $PGF_{2\beta}$, and $PGF_{3\beta}$, there are obtained the ethyl, butyl, 2-ethylhexyl, cyclohexylmethyl, and benzyl esters of each of those $PGF_\beta$ compounds.

Also following the procedure of Example 9 but using propionic anhydride, isobutyric anhydride, and hexanoic anhydride each in place of acetic anhydride, and using each in turn, dihydro-$PGF_{1\beta}$, $PGF_{1\beta}$, $PGF_{2\beta}$, $PGF_{3\beta}$, and the methyl, ethyl, butyl, 2-ethylhexyl, cyclohexylmethyl, and benzyl esters of each of those $PGF_\beta$ compounds, there are obtained the tripropionates, triisobutyrates, and trihexanoates of each of these $PGF_\beta$ acids and esters. Also following the procedure of Example 9, the triacetates of these other $PGF_\beta$ acids and esters are obtained.

Example 13.—Dihydro-$PGF_{1\beta}$

A solution of 0.200 g. of $PGF_{1\beta}$ in 50 ml. of 95% ethanol is hydrogenated at atmospheric pressure using 0.100 g. of 5% rhodium-on-alumina catalyst. When hydrogen uptake has ceased, the mixture is filtered and the filtrate is evaporated. The residue is chromatographed over 20 g. of acid-washed silica gel wet-packed in 75% ethyl acetate in benzene, eluting with 100 ml. of 75% ethyl acetate in benzene, 100 ml. of ethyl acetate, and 220 ml. of 2% methanol and 1% acetic acid in ethyl acetate, taking 20-ml. fractions. Fractions 13–21 are combined and evaporated to a residue (0.19 g.) which is crystallized from anhydrous ether to give dihydro-$PGF_{1\beta}$ with substantially the same physical properties as the product of Example 12.

We claim:
1. A compound of the formula:

(II)

wherein $R_1$ is hydrogen or hydrocarbyl of not more than 13 carbon atoms, and wherein all $R_2$ are hydrogen or all $R_2$ are lower alkanoyl, and pharmacologically acceptable salts thereof when $R_1$ is hydrogen.

2. A compound according to claim 1 wherein $R_1$ and all $R_2$ are hydrogen.

3. A compound according to claim 1 wherein $R_1$ is alkyl of one to 8 carbon atoms, inclusive, and all $R_2$ are hydrogen.

4. A compound according to claim 1 wherein $R_1$ is methyl and all $R_2$ are hydrogen.

5. A compound according to claim 1 wherein $R_1$ is alkyl of one to 8 carbon atoms, inclusive, and all $R_2$ are lower alkanoyl.

6. A compound according to claim 1 wherein $R_1$ is alkyl of one to 8 carbon atoms, inclusive, and all $R_2$ are acetyl.

7. A compound according to claim 1 wherein $R_1$ is methyl and all $R_2$ are acetyl.

References Cited

Linn et al.: Biochemical Pharmacology 8, 339 (1961).

LORRAINE A. WEINBERGER, Primary Examiner

R. GERSTL, Assistant Examiner

U.S. Cl. X.R.

260—211 R, 247.2 R, 268 R, 293.65, 326.3, 410, 429.9, 430, 439, 448 R, 488 R, 501.1, 501.15, 501.17, 501.2, 514 D

UNITED STATES PATENT AND TRADEMARK OFFICE
CERTIFICATE OF CORRECTION

PATENT NO. : 3,796,740
DATED : March 12, 1974
INVENTOR(S) : Sune Bergstrom and Jan Sjovall It is certified that error appears in the above–identified patent and that said Letters Patent are hereby corrected as shown below:

Column 1, line 70, Formula not numbered, should read -- (II) --.
Column 3, line 9, "proparyl." should read -- propargyl. --;
line 10, "Formulas I, II, III, IX, and V," should read --
Formulas I, II, III, IV, and V, --. Column 10, line 26, "to
give 2.10 of $PGF_2\beta$." should read -- to give 2.10 g. of $PGF_2\beta$. --.

Signed and Sealed this

*Thirteenth* Day of *September 1977*

[SEAL]

*Attest:*

RUTH C. MASON
*Attesting Officer*

LUTRELLE F. PARKER
*Acting Commissioner of Patents and Trademarks*